(12) United States Patent
Hamada (10) Patent No.: US 12,341,885 B2
(45) Date of Patent: Jun. 24, 2025

(54) SECRET BATCH APPROXIMATION SYSTEM, SECURE COMPUTATION DEVICE, SECRET BATCH APPROXIMATION METHOD, AND PROGRAM

(71) Applicant: NIPPON TELEGRAPH AND TELEPHONE CORPORATION, Tokyo (JP)

(72) Inventor: Koki Hamada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 552 days.

(21) Appl. No.: 17/055,993

(22) PCT Filed: May 20, 2019

(86) PCT No.: PCT/JP2019/019846
§ 371 (c)(1),
(2) Date: Nov. 17, 2020

(87) PCT Pub. No.: WO2019/225531
PCT Pub. Date: Nov. 28, 2019

(65) Prior Publication Data
US 2021/0287573 A1   Sep. 16, 2021

(30) Foreign Application Priority Data
May 25, 2018  (JP) .................................. 2018-100340

(51) Int. Cl.
*H04L 9/08*   (2006.01)
(52) U.S. Cl.
CPC ........ *H04L 9/0894* (2013.01); *H04L 2209/46* (2013.01)

(58) Field of Classification Search
CPC ..... G09C 1/00; H04L 9/0894; H04L 2209/46; H04L 9/085; G06F 17/17
See application file for complete search history.

(56) References Cited

U.S. PATENT DOCUMENTS 5,825,670 A  *  10/1998  Chernoff ................ G01Q 40/00
                                                        977/839
5,898,603 A  *   4/1999  Osborn .................. G06N 3/048
                                                        708/270

(Continued)

FOREIGN PATENT DOCUMENTS

EP   3 863 002 A1   8/2021

OTHER PUBLICATIONS

Lazzeretti et al., Piecewise Function Approximation With Private Data, IEEE, 2016.*

(Continued)

*Primary Examiner* — David Garcia Cervetti
(74) *Attorney, Agent, or Firm* — XSENSUS LLP (57) ABSTRACT

Calculation time is reduced without degrading approximation accuracy in calculation of a complicated function through secure computation. A secret batch approximation system calculates a concealed text [z] of an approximate value z for a function value y satisfying $y_j=f(x_j)$ by using a concealed text [x] of a value x as input. g is defined as a polynomial for approximating each section of m sections into which the function f is divided. A parameter acquisition unit acquires a concealed text [a] of a parameter a corresponding to the value x for each integer j that is not less than 1 and not more than n, where $a_j$ is defined as a parameter $p_i$ corresponding to a section $R_i$ including a value $x_j$. A polynomial calculation unit calculates a polynomial $g([x], [a])$ by using the concealed text [x] of the value x as input based on the concealed text [a].

7 Claims, 7 Drawing Sheets

PROCESSING FLOW OF PRESENT INVENTION

(56) References Cited

U.S. PATENT DOCUMENTS

| | | | | |
|---|---|---|---|---|
| 6,438,230 | B1* | 8/2002 | Moore | H04L 9/0618 380/42 |
| 6,941,463 | B1* | 9/2005 | Atallah | G06F 21/6254 709/201 |
| 7,366,745 | B1* | 4/2008 | Oberman | G06F 7/544 708/270 |
| 7,483,819 | B2* | 1/2009 | Gurumurthy | G06F 17/175 703/2 |
| 11,854,680 | B1* | 12/2023 | Gershoni | A61J 7/0069 |
| 2002/0087884 | A1* | 7/2002 | Shacham | H04L 9/302 726/8 |
| 2003/0046547 | A1* | 3/2003 | Jakobsson | G06F 7/723 713/180 |
| 2003/0091192 | A1* | 5/2003 | Chen | H04L 63/0457 380/277 |
| 2003/0101206 | A1* | 5/2003 | Graziano | H04L 1/0001 708/277 |
| 2004/0015830 | A1* | 1/2004 | Reps | G06F 17/10 717/104 |
| 2004/0071293 | A1* | 4/2004 | Yamamichi | H04L 9/3093 380/277 |
| 2005/0044123 | A1* | 2/2005 | Sazegari | G06F 7/552 708/446 |
| 2005/0275733 | A1* | 12/2005 | Chao | H04N 9/74 348/E5.051 |
| 2007/0098289 | A1* | 5/2007 | Kondo | G06T 1/00 382/254 |
| 2007/0230692 | A1* | 10/2007 | Akiyama | H04L 9/3026 380/44 |
| 2008/0209214 | A1* | 8/2008 | Schrijen | H04L 9/3242 713/169 |
| 2009/0185680 | A1* | 7/2009 | Akiyama | H04L 9/3093 380/30 |
| 2009/0322916 | A1* | 12/2009 | Wang | H04N 23/83 348/254 |
| 2010/0226496 | A1* | 9/2010 | Akiyama | H04L 9/3093 380/28 |
| 2011/0103583 | A1* | 5/2011 | Yoon | H04L 9/3093 380/255 |
| 2011/0196652 | A1* | 8/2011 | Tanaka | G06F 17/18 702/189 |
| 2012/0081168 | A1* | 4/2012 | Hastings | H03F 1/305 327/346 |
| 2013/0278661 | A1* | 10/2013 | Terada | B41J 19/145 347/14 |
| 2015/0046708 | A1* | 2/2015 | Yasuda | H04L 9/3093 713/168 |
| 2015/0142990 | A1 | 5/2015 | Adachi et al. | |
| 2015/0270967 | A1* | 9/2015 | Susella | H04L 9/003 380/30 |
| 2015/0280914 | A1* | 10/2015 | Yasuda | H04L 9/14 380/30 |
| 2015/0318991 | A1* | 11/2015 | Yasuda | H04L 9/3093 380/28 |
| 2016/0034421 | A1* | 2/2016 | Magesacher | H04L 27/3427 703/2 |
| 2016/0072801 | A1* | 3/2016 | Cao | H04L 9/0866 713/186 |
| 2016/0080333 | A1* | 3/2016 | Isshiki | H04L 9/3093 713/168 |
| 2016/0173275 | A1* | 6/2016 | Yasuda | H04L 9/14 380/28 |
| 2016/0197726 | A1* | 7/2016 | Yasuda | H04L 9/14 380/28 |
| 2016/0269174 | A1* | 9/2016 | Yasuda | H04L 9/008 |
| 2016/0350552 | A1* | 12/2016 | Matsuzaki | G06F 16/9535 |
| 2016/0350648 | A1* | 12/2016 | Gilad-Bachrach | G06N 3/08 |
| 2016/0352510 | A1* | 12/2016 | Morikawa | G09C 1/00 |
| 2016/0352710 | A1* | 12/2016 | Hibshoosh | H04L 63/061 |
| 2016/0380653 | A1* | 12/2016 | Sheikh | H04B 1/0475 370/282 |
| 2017/0083287 | A1* | 3/2017 | Yu | G06F 7/556 |
| 2017/0099263 | A1* | 4/2017 | Matsuzaki | H04L 67/12 |
| 2017/0272244 | A1* | 9/2017 | Garcia Morchon | H04L 9/0869 |
| 2017/0308357 | A1* | 10/2017 | Bekas | G06F 7/556 |
| 2018/0032311 | A1* | 2/2018 | Mathew | G06F 17/17 |
| 2018/0034630 | A1* | 2/2018 | Rietman | H04L 9/0869 |
| 2018/0040160 | A1* | 2/2018 | Moon | G06T 15/06 |
| 2018/0096248 | A1* | 4/2018 | Chabanne | G06N 3/08 |
| 2019/0042924 | A1* | 2/2019 | Pasca | G06F 7/548 |
| 2019/0065974 | A1* | 2/2019 | Michigami | G06N 3/084 |
| 2019/0182216 | A1* | 6/2019 | Gulak | H04L 63/0414 |
| 2019/0272361 | A1* | 9/2019 | Kursun | H04L 67/535 |
| 2019/0333415 | A1* | 10/2019 | Hamada | G06F 7/535 |
| 2020/0242466 | A1* | 7/2020 | Mohassel | G06F 21/6254 |
| 2020/0304293 | A1* | 9/2020 | Gama | H04L 9/00 |
| 2022/0230057 | A1* | 7/2022 | Pasca | G06F 7/548 |
| 2024/0225087 | A1* | 7/2024 | Quitorio | A24D 1/18 |

OTHER PUBLICATIONS

Lazzeretti et al., Piecewise Function Approximation With Private Data, IEEE (Year: 2015).*

Chida et al., "A Three-Party Secure Function Evaluation with Lightweight Verifiability Revisited", CSS 2010, 13 pages including English Translation.

Kamm et al., "Secure floating point arithmetic and private satellite collision analysis", International Journal of Information Security, vol. 14, No. 6, 2015, pp. 531-548.

Hamada et al., "A Batch Mapping Algorithm for Secure Function Evaluation", The transactions of the Institute of Electronics, Information and Communication Engineers, vol. J96-A, No. 4, 2013, pp. 157-165 (10 pages including English abstract).

Laud, "Parallel Oblivious Array Access for Secure Multiparty Computation and Privacy-Preserving Minimum Spanning Trees", Proceedings on Privacy Enhancing Technologies, 2015, pp. 188-205.

Mohassel et al., "SecureML: A System for Scalable Privacy-Preserving Machine Learning", In 2017 IEEE Symposium on Security and Privacy, IEEE Computer Society, San Jose, CA, USA, May 22-26, 2017, pp. 1-20.

* cited by examiner

APPROXIMATION METHOD OF RELATED ART

FUNCTION f(x) HAS FIVE PEAKS ON TOP AND BOTTOM, SO THAT AT LEAST SIXTH-ORDER POLYNOMIAL IS REQUIRED TO APPLY APPROXIMATION BY POLYNOMIAL g(x) (HIGHER-ORDER POLYNOMIAL IS USED IN ORDER TO IMPROVE ACCURACY IN PRACTICE)

PARAMETER $a := (b, c, d, e, f, g, h)$
APPROXIMATE FORMULA $g(x, a) = bx^6+cx^5+dx^4+ex^3+fx^2+gx+h$

NUMBER OF TIMES OF CALCULATION REQUIRED
FOR OBTAINING ONE SOLUTION
→ MULTIPLICATION: 11 TIMES, ADDITION-AND-SUBTRACTION: 6 TIMES

APPROXIMATION METHOD OF PRESENT INVENTION

DIVIDE DOMAIN OF DEFINITION OF FUNCTION f(x) INTO m PIECES OF SECTIONS AND APPROXIMATE EACH SECTION BY QUADRATIC POLYNOMIAL (QUADRATIC FUNCTION)

PARAMETER a := (b, c, d)
APPROXIMATE FORMULA g(x, a) = $bx^2+cx+d$

NUMBER OF TIMES OF CALCULATION REQUIRED FOR OBTAINING ONE SOLUTION
→ MULTIPLICATION: 3 TIMES, ADDITION-AND-SUBTRACTION: TWICE

SECRET BATCH APPROXIMATION SYSTEM, SECURE COMPUTATION DEVICE, SECRET BATCH APPROXIMATION METHOD, AND PROGRAM

CROSS-REFERENCE TO RELATED APPLICATIONS

The present application is based on PCT filing PCT/JP2019/019846, filed May 20, 2019, which claims priority to JP 2018-100340, filed May 25, 2018, the entire contents of each are incorporated herein by reference.

TECHNICAL FIELD

The present invention relates to a technique for performing approximation calculation for a function through secure computation.

BACKGROUND ART

As a method for obtaining a specified operation result without reconstructing encrypted numerical values, there is a method called secure computation (see Non-patent Literature 1, for example). In the method described in Non-patent Literature 1, encryption for distributing shares of a numerical value over three secure computation devices is performed, and the three secure computation devices perform cooperative calculation and are accordingly allowed to hold results of addition-and-subtraction, constant addition, multiplication, constant multiplication, logical operations (a NOT, an AND, an OR, and an XOR), and data format conversion (an integer or a binary) in a state that the results are distributed over the three secure computation devices, that is, in an encrypted state, without reconstructing numerical values.

As a method for realizing calculation of a complicated function such as an exponential function and a logarithmic function on secure computation, calculation is performed by approximating the function to a polynomial which can be calculated through a combination of addition-and-subtraction and multiplication. Non-patent Literature 2, for example, describes a method for performing calculation by approximating an exponential function to a polynomial.

PRIOR ART LITERATURE

Non-Patent Literature

Non-patent Literature 1: Koji Chida, Koki Hamada, Dai Ikarashi, Katsumi Takahashi, "A Three-party Secure Function Evaluation with Lightweight Verifiability Revisited", CSS, 2010

Non-patent Literature 2: Liina Kamm and Jan Willemson, "Secure floating point arithmetic and private satellite collision analysis," International Journal of Information Security, Vol. 14, No. 6, pp. 531-548, 2015.

SUMMARY OF THE INVENTION

Problems to be Solved by the Invention

However, in polynomial approximation of a complicated function, the order of the polynomial needs to be increased so as to improve approximation accuracy, in related art. For example, an approximate formula expressed by the fourth-order polynomial is calculated so as to realize calculation of an exponential function in Non-patent Literature 2. Further, a sigmoid function used in logistic regression and a neural network requires at least the tenth-order polynomial so as to secure sufficient accuracy. When the order n of a polynomial is increased, the number of times of addition-and-subtraction and multiplication is increased in O(n), increasing calculation time.

In view of the above-described technical problems, the present invention is aimed to reduce calculation time without degrading approximation accuracy when a complicated function is calculated through secure computation.

Means to Solve the Problems

In order to solve the above-described problem, a secret batch approximation system according to one aspect of the present invention includes a plurality of secure computation devices, in which a concealed text $[z] := ([z_1], \ldots, [z_n])$ of an approximate value $z := (z_1, \ldots, z_n)$ for a function value $y := (y_1, \ldots, y_n)$ satisfying $y_j = f(x_j)$ is calculated for each integer j, the integer j being not less than 1 and not more than n, by using a concealed text $[x] := ([x_1], \ldots, [x_n])$ of n pieces of values $x := (x_1, \ldots, x_n)$ as input when n is defined as an integer being not less than 1. m is defined as an integer being not less than 2, g is defined as a polynomial for approximating each section of m sections into which the function f is divided, i is defined as each integer being not less than 1 and not more than m, $R_i$ is defined as the section, and $p_i$ is defined as a parameter of the polynomial g corresponding to the section $R_i$. Each of the secure computation devices comprises: a parameter acquisition unit that acquires a concealed text $[a] := ([a_1], \ldots, [a_n])$ of a parameter $a := (a_1, \ldots, a_n)$ corresponding to the value $x := (x_1, \ldots, x_n)$ for each integer j, where aj is defined as the parameter $p_i$ corresponding to the section $R_i$ including the value $x_j$; and a polynomial calculation unit that calculates the polynomial $g([x], [a])$ by using the concealed text $[x]$ of the value x as input based on the concealed text $[a]$ of the parameter a so as to obtain the concealed text $[z]$ of the approximate value z for the function value y.

Effects of the Invention

According to the secret batch approximation technique of the present invention, in calculation of a complicated function through secure computation, approximation can be performed by a lower-order polynomial than that of related art and calculation time can be accordingly reduced without degrading approximation accuracy.

DETAILED DESCRIPTION OF THE EMBODIMENTS

Notation and definitions of terms in this specification are first described.

<Notation>

A value obtained by concealing a certain value a through encryption, secret sharing, or the like is referred to as a concealed text of a and expressed as [a]. Further, a is referred to as a plaintext of [a]. When concealment is performed through secret sharing, a set of shares of secret sharing, which are held by each secure computation device, is referred to by [a].

[a, b] (square bracket) in a domain of definition of a variable denotes a closed section and (a, b) (parentheses) denotes an open section. For example, i∈[a, b] represents that i is a value which is not less than a and not more than b. Further, i∈[a, b) represents that i is a value which is not less than a and less than b.

<Addition, Subtraction, Multiplication>

In each operation of addition, subtraction, and multiplication with respect to concealed texts, concealed texts $[c_1]$, $[c_2]$, and $[c_3]$ of respective calculation results $c_1$, $c_2$, and $c_3$ of a+b, a−b, and ab are calculated by using concealed texts [a] and [b] of two values a and b as input. Execution of these operations are respectively expressed as the following formulas.

$$[c_1] \leftarrow Add([a],[b])$$

$$[c_2] \leftarrow Sub([a],[b])$$

$$[c_3] \leftarrow Mul([a],[b])$$

When there is no possibility of misunderstanding, Add([a], [b]), Sub([a], [b]), and Mul([a], [b]) are respectively abbreviated as [a]+[b], [a]−[b], and [a]×[b].

<Batch mapping>

In an operation of batch mapping, concealed texts $([y_1], \ldots, [y_n])$ of n pieces of values $(y_1, \ldots, y_n)$ (here, it is assumed that each $y_i$ satisfies $y_i = a_j$ where j satisfies $x_i < u_j$ when j=1 and $u_{j-1} \leq x_i < u_j$ otherwise) are calculated by using concealed texts $([x_1], \ldots, [x_n])$ of n pieces of values $(x_1, \ldots, x_n)$ (here, it is assumed that each $x_j$ satisfies $x_j < u_m$ for later-described $u_m$) and tuples of m pieces of values $(u_1, \ldots, u_m)$ (here, $u_i < u_{i+1}$) and m pieces of values $(a_1, \ldots, a_m)$ as input. Execution of this operation is expressed as the following formula.

$$([y_1], \ldots, [y_n]) \leftarrow \text{BatchMap}(([x_1], \ldots, [x_n]), (u_1, \ldots, u_m), (a_1, \ldots, a_m))$$

Reference Literatures 1 and 2 below describe a secure computation batch mapping algorithm for efficiently calculating batch mapping through secure computation.

[Reference Literature 1] Koki Hamada, Dai Ikarashi, Koji Chida, "A Batch Mapping Algorithm for Secure Function Evaluation", The transactions of the Institute of Electronics, Information and Communication Engineers. A, Vol. J96-A, No. 4, pp. 157-165, 2013

[Reference Literature 2] Peeter Laud, "Parallel Oblivious Array Access for Secure Multiparty Computation and Privacy-Preserving Minimum Spanning Trees", PoPETs 2015(2), pp. 188-205, 2015.

[General Outline of Invention]

The present invention utilizes the fact that even a complicated function can be approximated with sufficient accuracy even by a low-order polynomial if sections of the function are limited. Specifically, a function is divided into a plurality of sections, each of the sections is approximated by a lower-order polynomial, and the whole function is thus approximated by a plurality of low-order polynomials. In practical calculation, a section in which an input is included is specified and a low-order polynomial is calculated by using a parameter corresponding to the section. Accordingly, approximation exhibiting accuracy equivalent to accuracy of related art can be realized by using approximate formulas of a lower order when a number of calculation is performed in batch. Since calculation time of a polynomial is proportional to an order of the polynomial, entire calculation time can be reduced without degrading approximation accuracy.

Figure 1:
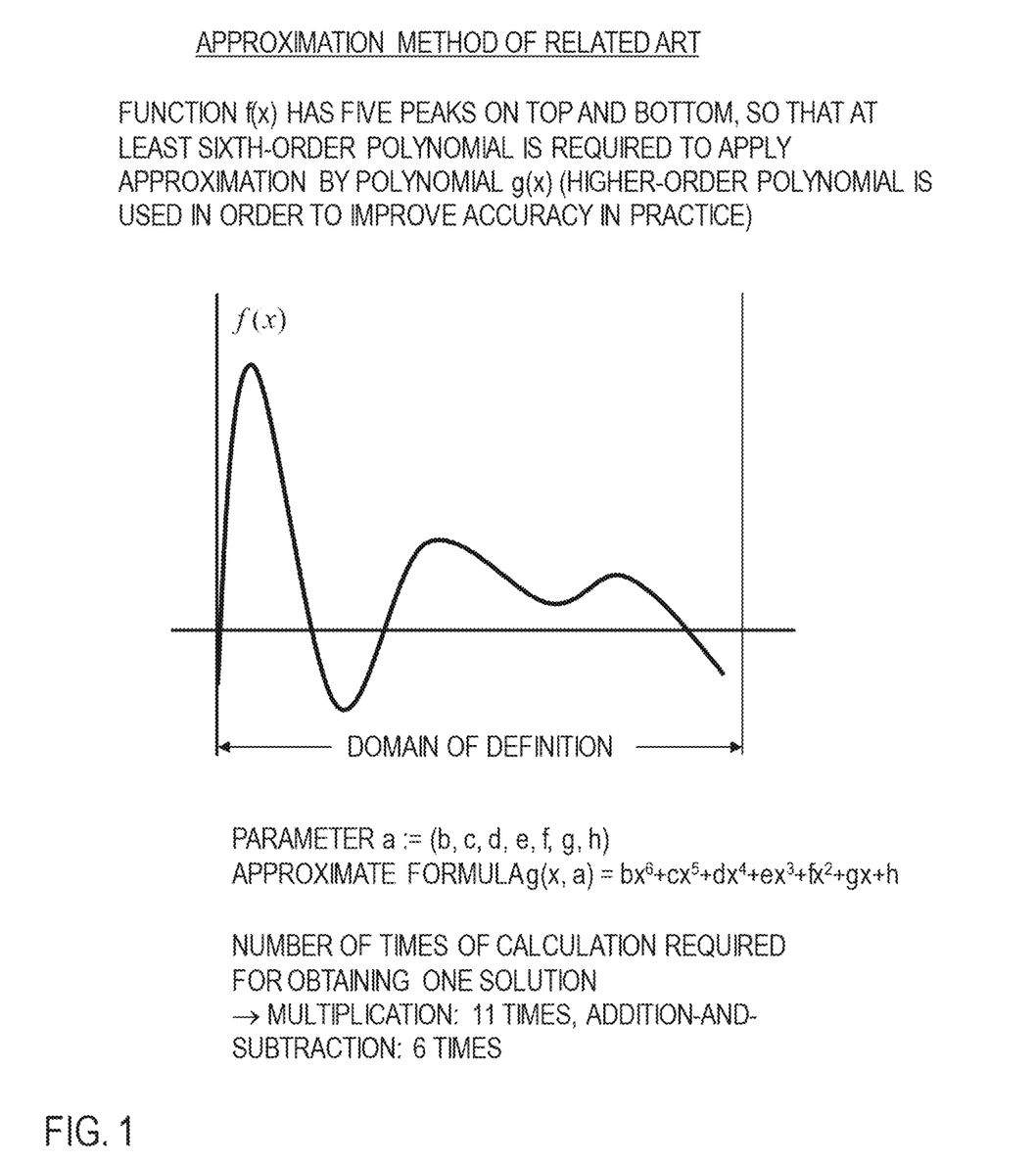
FIG. 1 is a diagram for explaining an approximation method of related art.

FIG. 1 illustrates a specific example of calculating a complicated function through polynomial approximation according to related art. A function f(x) which is a calculation target has five peaks on top and bottom, so that at least the sixth-order polynomial is required to apply approximation by a polynomial g(x, a). In order to obtain sufficient accuracy, approximation is performed with the use of a higher-order polynomial in practice. For example, a parameter a of the polynomial g(x, a) is a :=(b, c, d, e, f, g, h) and the polynomial g(x, a) can be defined as $g(x, a) = bx^6 + cx^5 + dx^4 + ex^3 + fx^2 + gx + h$. In this case, the number of times of calculation required for obtaining one solution is 11 times for multiplication and six times for addition-and-subtraction.

Figure 2:
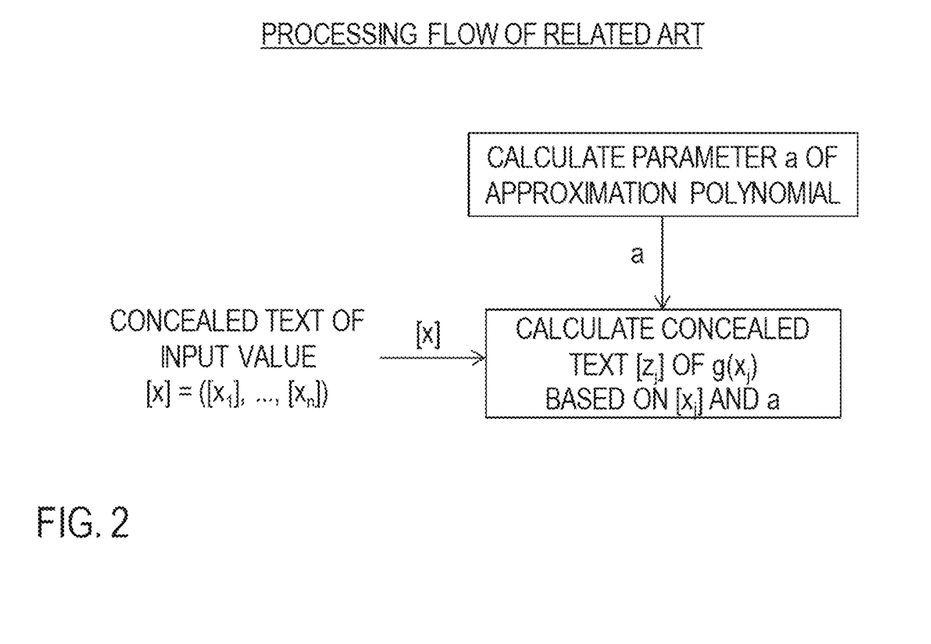
FIG. 2 is a diagram for explaining a processing flow of the related art.

FIG. 2 illustrates a processing flow of the related art. The parameter a of the polynomial g(x, a) for approximating the function f(x) is first calculated. Then, a polynomial $[z_j] = g([x_j], a)$ is calculated for each integer j which is not less than 1 and not more than n by using concealed texts $[x] := ([x_1], \ldots, [x_n])$ of input values $x := (x_1, \ldots, x_n)$ and the parameter a so as to obtain concealed texts $[z] := ([z_1], \ldots, [z_n])$ of approximate values $z := (z_1, \ldots, z_n)$ of function values $y := (y_1, \ldots, y_n)$.

Figure 3:
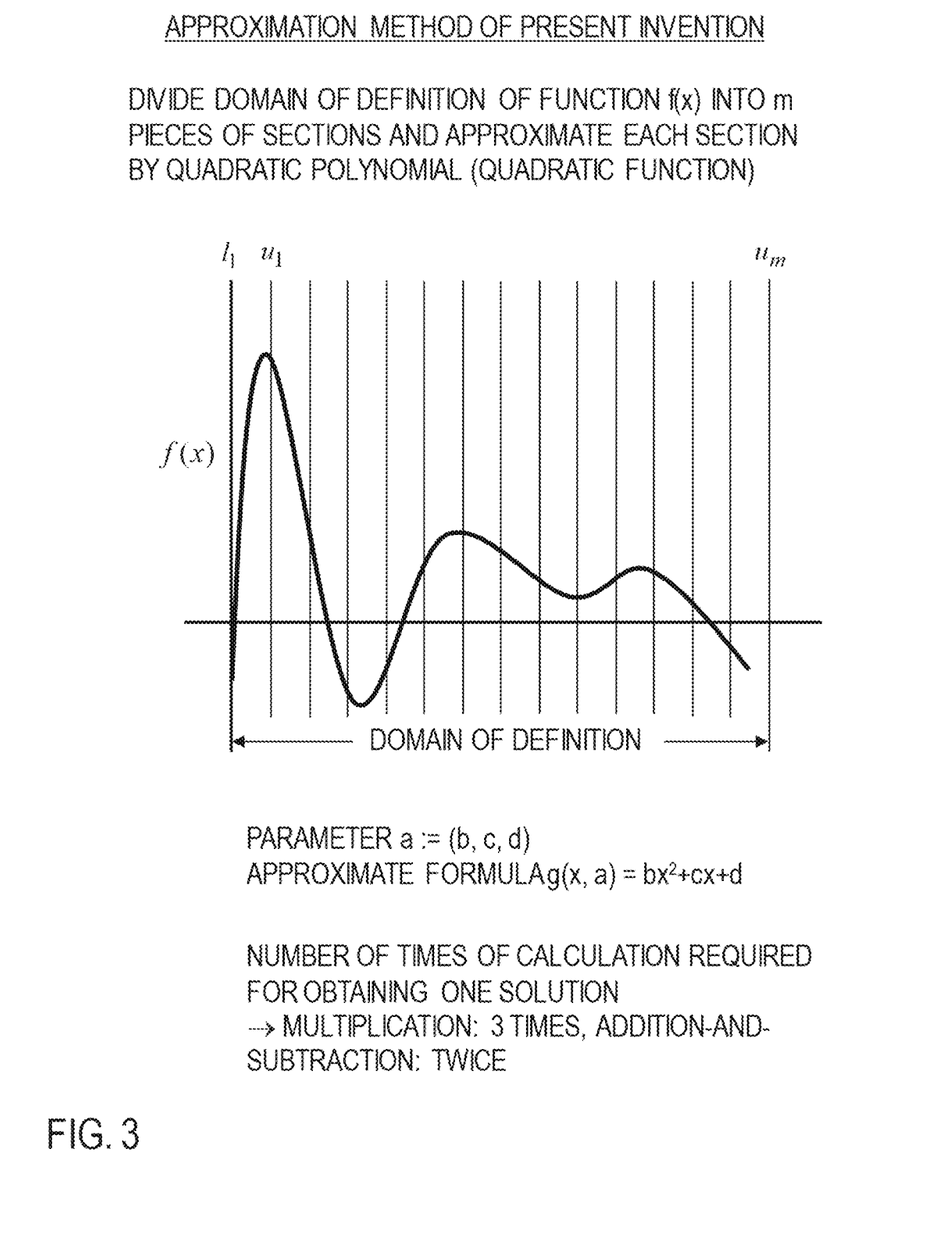
FIG. 3 is a diagram for explaining an approximation method of the present invention.

FIG. 3 illustrates a specific example for calculating a complicated function through polynomial approximation according to the present invention. A domain of definition of a function f(x) which is a calculation target is divided into m pieces of sections and each of the sections is approximated by a quadratic polynomial (that is, a quadratic function). Here, a parameter a of a polynomial g(x, a) is a :=(b, c, d) and the polynomial g(x, a) can be defined as $g(x, a) = bx^2 + cx + d$. In this case, the number of times of calculation required for obtaining one solution can be reduced to three times for multiplication and twice for addition-and-subtraction.

Figure 4:
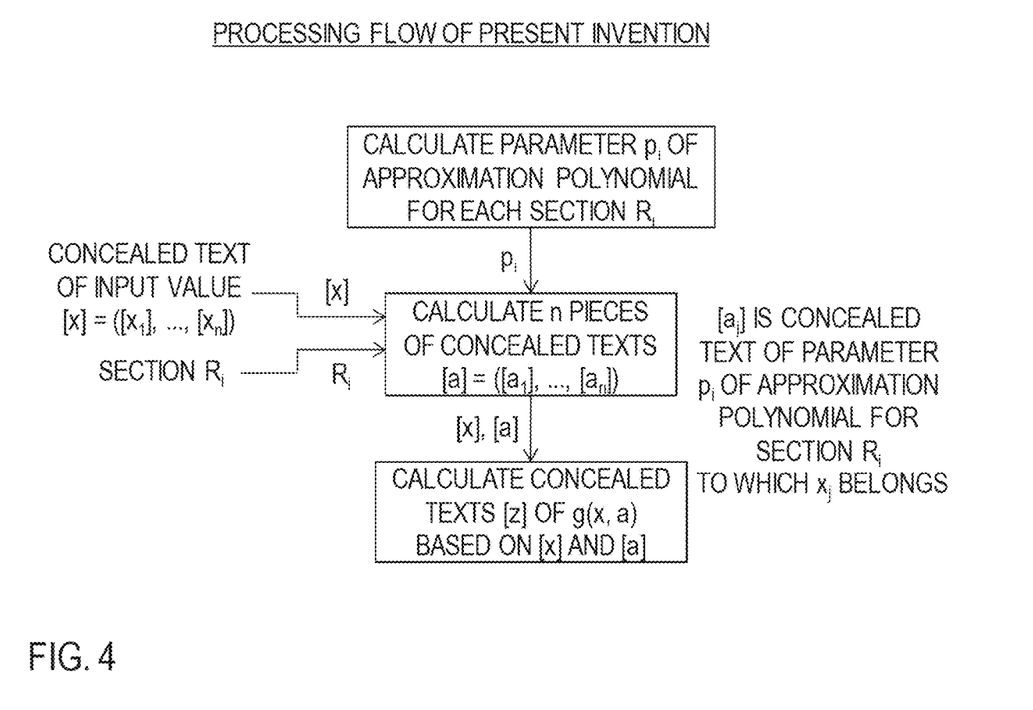
FIG. 4 is a diagram for explaining a processing flow of the present invention.

FIG. 4 illustrates a processing flow of the present invention. A parameter $p_i$ of the polynomial g(x, a) for approximating each section $R_i$ (i=1, ..., m) of the function f(x) is first calculated. Then, concealed texts $[a] := ([a_1], \ldots, [a_n])$ of n pieces of parameters are calculated by using the concealed texts $[x] := ([x_1], \ldots, [x_n])$ of input values $x := (x_1, \ldots, x_n)$ and tuples of a section $(R_1, \ldots, R_m)$ and a parameter $(p_1, \ldots, p_m)$. Here, $[a_j]$ is a concealed text of the parameter $p_i$ corresponding to the section $R_i$ to which $x_j$ belongs. At the end, polynomials $[z_j] = g([x_j], [a_j])$ are calculated for respective integers j which are not less than 1 and not more than n by using the concealed texts $[x] := ([x_1], \ldots, [x_n])$ of the input values $x := (x_1, \ldots, x_n)$ and the concealed texts $[a] := ([a_1], \ldots, [a_n])$ of the parameters a :=$(a_1, \ldots, a_n)$ so as to obtain concealed texts $[z] := ([z_1], \ldots, [z_n])$ of approximate values $z := (z_1, \ldots, z_n)$ for the function values $y := (y_1, \ldots, y_n)$.

Embodiments according to the present invention are described in detail below. It is to be noted that components mutually having the same function are identified with the same reference character in the drawings and duplicate description thereof are omitted.

First Embodiment

Figure 5:
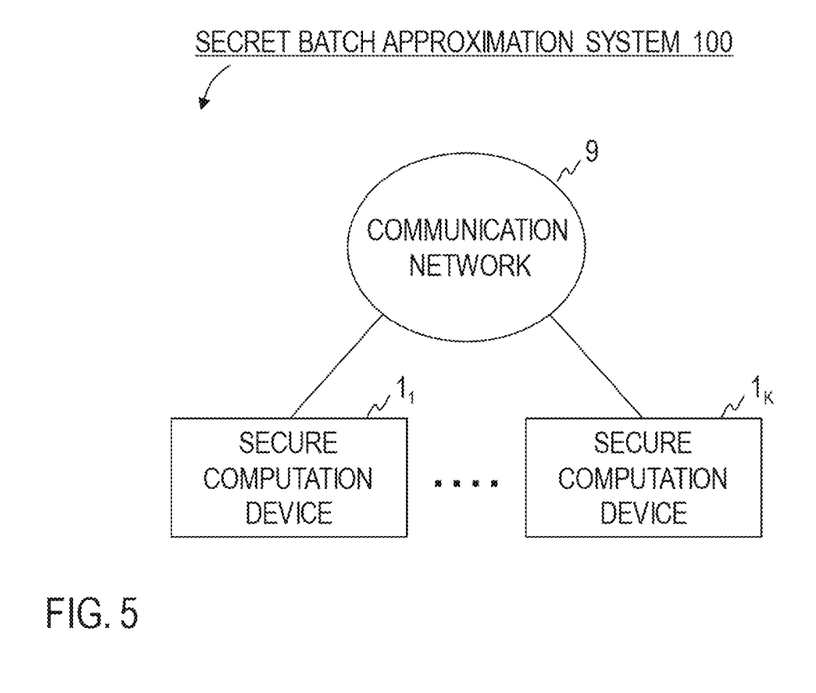
FIG. 5 is a diagram illustrating a functional configuration of a secret batch approximation system.

A configuration example of a secret batch approximation system 100 according to a first embodiment will be described with reference to FIG. 5. The secret batch approximation system 100 includes K (≥2) pieces of secure computation devices $\mathbf{1}_1, \ldots, \mathbf{1}_K$. In the present embodiment, the secure computation devices $\mathbf{1}_1, \ldots, \mathbf{1}_K$ are each connected to a communication network 9. The communication network 9 is a circuit-switched or packet-switched communication network configured to allow mutual communication of devices connected thereto, and Internet, local area network (LAN), and wide area network (WAN), for example, can be used as the communication network 9. Here, each device is not necessarily communicable via the communication network 9 online. For example, the configuration may be employed in which information to be inputted into the secure computation devices $\mathbf{1}_1, \ldots, \mathbf{1}_K$ is stored in a portable recording medium such as a magnetic tape and a USB memory and the information is inputted into the secure computation devices $\mathbf{1}_1, \ldots, \mathbf{1}_K$ from the portable recording medium offline.

Figure 6:
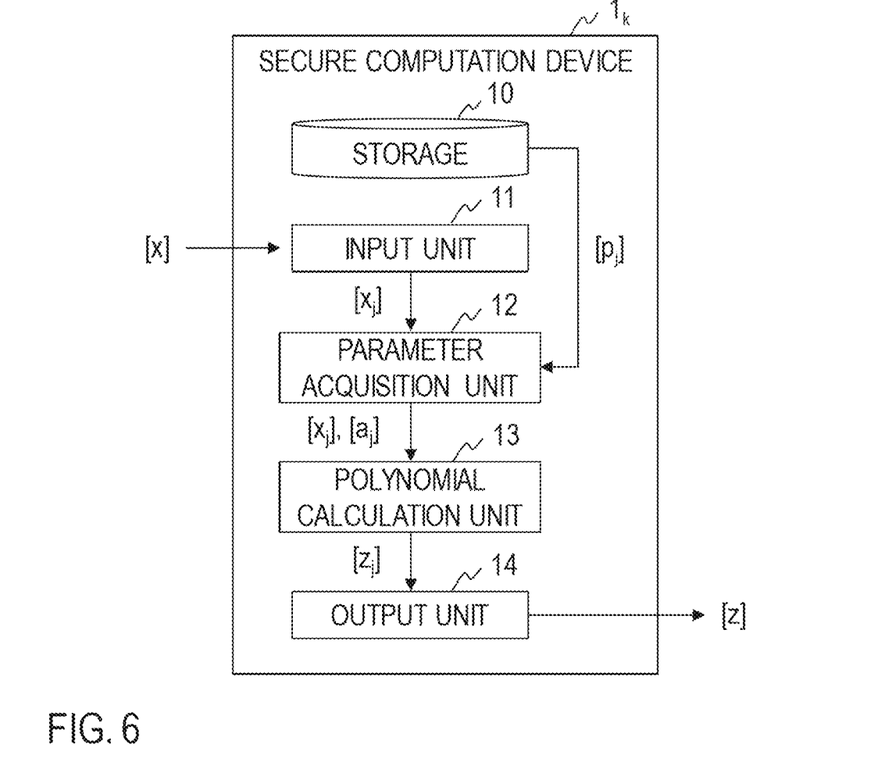
FIG. 6 is a diagram illustrating a functional configuration of a secure computation device.

A configuration example of the secure computation device $\mathbf{1}_k$ (k=1, . . . , K) included in the secret batch approximation system 100 according to the present embodiment will be described with reference to FIG. 6. The secure computation device $\mathbf{1}_k$ includes a storage 10, an input unit 11, a parameter acquisition unit 12, a polynomial calculation unit 13, and an output unit 14, for example, as illustrated in FIG. 6. The secure computation device $\mathbf{1}_k$ (k=1, . . . , K) performs processing of each step described later in cooperation with other secure computation devices $\mathbf{1}_{k'}$ (k'=1, . . . , K, where k≠k'), realizing the secret batch approximation method according to the present embodiment.

The secure computation device $\mathbf{1}_k$ is a special device configured in a manner that a special program is read in a known or dedicated computer including a central processing unit (CPU) and a main storage unit (random access memory: RAM), for example. The secure computation device $\mathbf{1}_k$ executes each processing under the control of the central processing unit, for example. Data inputted into the secure computation device $\mathbf{1}_k$ and data obtained through each processing are stored, for example, in the main storage unit and the data stored in the main storage unit is read onto the central processing unit as needed and used for other processing. At least part of processing units of the secure computation device $\mathbf{1}_k$ may be composed of hardware such as an integrated circuit. Each storage included in the secure computation device $\mathbf{1}_k$ may be composed of a main storage unit such as a random access memory (RAM), an auxiliary storage unit composed of a hard disk, an optical disk, or a semiconductor memory element such as a flash memory, or middleware such as relational database and a key-value store, for example.

Figure 7:
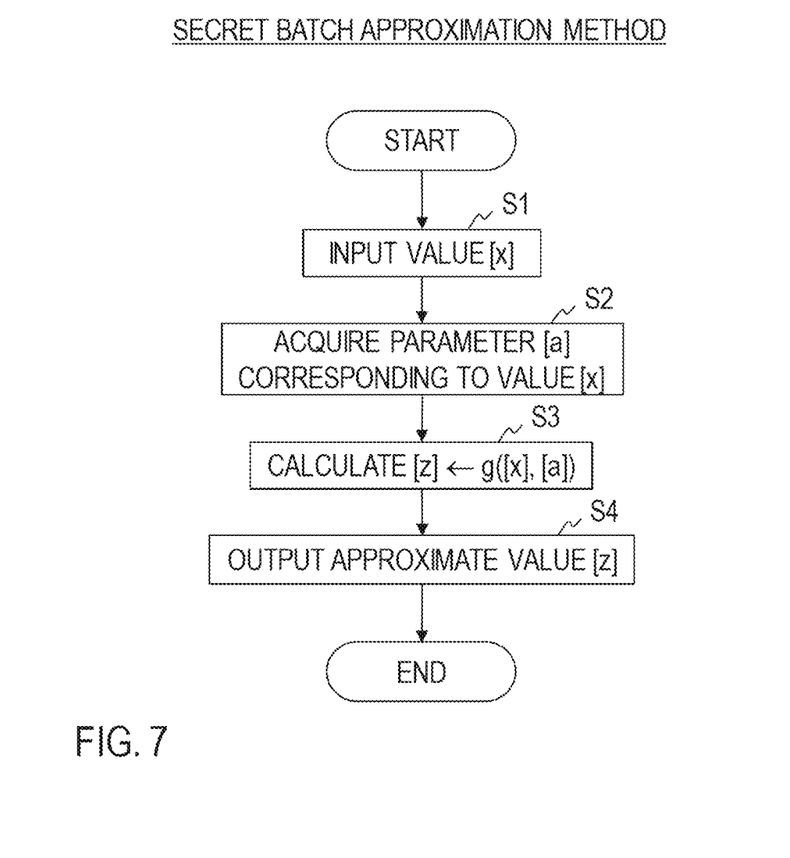
FIG. 7 is a diagram illustrating a processing procedure of a secret batch approximation method.

A processing procedure of the secret batch approximation method executed by the secret batch approximation system 100 according to the present embodiment will be described with reference to FIG. 7.

The polynomial g(x, a) and a sequence $((R_1, p_1), \ldots, (R_m, p_m))$ of tuples of a section and a parameter are stored in the storage 10 of each secure computation device $\mathbf{1}_k$. The polynomial g(x, a) is a polynomial for approximating each of sections obtained by dividing the function f(x), which is a calculation target, into predetermined m sections and is a polynomial of lower order than a polynomial for approximating the whole of the function f(x). a denotes a parameter for defining the polynomial g(x, a) and is an array of coefficients of respective terms, for example. $R_i$ (i=1, . . . , m) denotes information indicating each of the sections obtained by dividing the function f(x) into m sections. $p_i$ (i=1, . . . , m) denotes a parameter for approximating the section $R_i$ of the function f(x) by the polynomial g(x, a).

In step S1, the input unit 11 of each secure computation device $\mathbf{1}_k$ receives the concealed texts $[x] := ([x_1], \ldots, [x_n])$ of n pieces of values $x := (x_1, \ldots, x_n)$ being calculation targets, as input. The input unit 11 outputs the concealed texts [x] of the values x to the parameter acquisition unit 12.

In step S2, the parameter acquisition unit 12 of each secure computation device $\mathbf{1}_k$ receives the concealed texts [x] of the values x from the input unit 11, and acquires the concealed texts $[a] := ([a_1], \ldots, [a_n])$ of n pieces of parameters $a := (a_1, \ldots, a_n)$ satisfying $\forall j \in [1, n]$ and $\exists i$ s.t. $a_j = p_i$, $x_j \in R_i$ from the sequence $((R_1, p_1), \ldots, (R_m, p_m))$ of tuples of a section and a parameter which are stored in the storage 10, for respective integers j which are not less than 1 and not more than n. That is, the concealed texts $[a_1], \ldots, [a_n]$ of the parameters $a_1, \ldots, a_n$ respectively corresponding to the values $x_1, \ldots, x_n$ are generated for respective integers j which are not less than 1 and not more than n, where $a_j$ is defined as the parameter $p_i$ of the section $R_i$ corresponding to the value $x_j$. The parameter acquisition unit 12 outputs the concealed texts [x] of the values x and the concealed texts [a] of the parameters a to the polynomial calculation unit 13.

In step S3, the polynomial calculation unit 13 of each secure computation device $\mathbf{1}_k$ receives the concealed texts [x] of the values x and the concealed texts [a] of the parameters a from the parameter acquisition unit 12 and calculates $[z_j] = g([x_j], [a_j])$ in accordance with the polynomial g(x, a) stored in the storage 10 for respective integers j which are not less than 1 and not more than n. The polynomial calculation unit 13 outputs the concealed texts $[z] := ([z_1], \ldots, [z_n])$ of the approximate values $z := (z_1, \ldots, z_n)$ for the function values $y := (y_1, \ldots, y_n)$ to the output unit 14.

In step S4, the output unit 14 of each secure computation device $\mathbf{1}_k$ receives the concealed texts [z] of the approximate values z for the function values y from the polynomial calculation unit 13 and sets the concealed texts [z] as output of the secure computation device $\mathbf{1}_k$.

Second Embodiment

A second embodiment describes a more specific example in which the following sigmoid function, a domain of definition of which is expressed as X := [0, 1000), is approximated by a quadratic function.

$$f(x) = \sigma(x) = \frac{1}{1+e^{-x}}$$

Differences from the first embodiment will be mainly described below.

A polynomial g(x, a) and a sequence $((R_1, p_1), \ldots, (R_m, p_m))$ of tuples of a section and a parameter are stored in the storage 10 of each secure computation device $\mathbf{1}_k$. A parameter of the polynomial g(x, a) of the present embodiment is a := (b, c, d) and the polynomial g(x, a) is defined as g(x, a)=$bx^2$+cx+d. The section $R_i$ of the present embodiment is defined as $R_i := [1_i, u_i)$ for $i \in [1, m]$ (here, $1_1=0$, $u_m=1000$, $u_i=1_{i+1}$, and $1_i \leq u_i$ for $i \in [1, m)$). The parameter $p_i$ of the present embodiment is defined as $p_i := (b_i, c_i, d_i)$.

The parameter acquisition unit 12 of each secure computation device $1_k$ according to the present embodiment executes a secure computation batch mapping algorithm as the following formula by using the concealed texts $[x]$, $(u_1, \ldots, u_m)$, and $((b_1, c_1, d_1), \ldots, (b_m, c_m, d_m))$ as input, acquiring concealed texts $[a] := ([a_1], \ldots, [a_n])$ of the parameters a $(a_1, \ldots, a_n)$.

$([a_1], \ldots, [a_n]) \leftarrow \text{BatchMap}([x], (u_1, \ldots, u_m), ((b_1, c_1, d_1), \ldots, (b_m, c_m, d_m)))$ Here, $a_j$ satisfies $a_j = (b_i, c_i, d_i)$ for certain i satisfying $x_j \in R_i$.

The polynomial calculation unit 13 of each secure computation device $1_k$ according to the present embodiment calculates the following formula based on $[a_j] := ([b'_j], [c'_j], [d'_j])$ for each integer j which is not less than 1 and not more than n, obtaining a concealed text $[z_j]$ of an approximate value $z_j$.

$[z_j] \leftarrow [b'_i] \times [x_j] \times [x_j] + [c'_i] \times [x_j] + [d'_i]$ The present invention utilizes the fact that even a complicated function can be approximated with sufficient accuracy even by a low-order polynomial if sections of the function are limited. Specifically, a function is divided into the predetermined number of sections to obtain parameters for approximating respective sections by low-order polynomials in advance, and low-order polynomial approximation is performed through acquiring a parameter corresponding to an input value depending on the section including the input value. Accordingly, approximation exhibiting accuracy equivalent to accuracy of related art can be realized by using lower-order polynomials when a number of calculation is performed in batch. Especially, polynomial approximation can be more efficiently performed through acquiring parameters corresponding to respective input values of a plurality of input values by using a secure computation batch mapping algorithm for the input values. For example, it is reported that at least tenth order is experimentally required so as to obtain sufficient accuracy in logistic regression for a sigmoid function which is heavily required in each iterative calculation in learning of logistic regression (see Reference Literature 3). However, if the number of sections is set to 5000, for example, approximation can be realized by a cubic polynomial with almost double accuracy and the number of times of multiplication and addition for real numbers can be reduced by 70 percent.

[Reference Literature 3] Payman Mohassel and Yupeng Zhang, "SecureML: A system for scalable privacy-preserving machine learning," In 2017 IEEE Symposium on Security and Privacy, S P 2017, San Jose, CA, USA, May 22-26, 2017, pp. 19-38. IEEE Computer Society, 2017.

While the embodiments of the present invention have been described, specific configurations are not limited to these embodiments, but design modifications and the like within a range not departing from the spirit of the invention are encompassed in the scope of the invention, of course. The various processes described in the embodiments may be executed in parallel or separately depending on the processing ability of a device executing the process or on any necessity, rather than being executed in time series in accordance with the described order.

[Program and Recording Medium]

When various types of processing functions in the devices described in the above embodiments are implemented on a computer, the contents of processing function to be contained in each device is written by a program. With this program executed on the computer, various types of processing functions in the above-described devices are implemented on the computer.

This program in which the contents of processing are written can be recorded in a computer-readable recording medium. The computer-readable recording medium may be any medium such as a magnetic recording device, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be stored in a storage unit of a server computer and transferred from the server computer to other computers via a network so as to be distributed.

A computer which executes such program first stores the program recorded in a portable recording medium or transferred from a server computer once in a storage unit thereof, for example. When the processing is performed, the computer reads out the program stored in the storage unit thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that a program in this form includes information which is provided for processing performed by electronic calculation equipment and which is equivalent to a program (such as data which is not a direct instruction to the computer but has a property specifying the processing performed by the computer).

In this form, the present device is configured with a predetermined program executed on a computer. However, the present device may be configured with at least part of these processing contents realized in a hardware manner.

What is claimed is:

1. A secret batch approximation system including three or more secure computation apparatuses for calculating a concealed text $[z] := ([z_1], \ldots, [z_n])$ of an approximate value $z := (z_1, \ldots, z_n)$ for a function value $y := (y_1, \ldots, y_n)$ satisfying $y_j = f(x_j)$ for each integer j, the integer j being greater than or equal to 1 and less than or equal to n, the three or more secure computation apparatuses cooperatively calculating the concealed text $[z]$ using a concealed text $[x] := ([x_1], \ldots, [x_n])$ of n pieces of values $x := (x_1, \ldots, x_n)$ as input when n is defined as an integer greater than or equal to 1, wherein m is defined as an integer greater than or equal to 2, g is defined as a polynomial for approximating each section of m sections into which a function f is divided, i is defined as each integer and is greater than or equal to 1 and less than or equal to m, $R_i$ is defined as one of the m sections, and $p_i$ is defined as a parameter of the polynomial g corresponding to the section $R_i$, each of the three or more secure computation apparatuses comprises processing circuitry configured to:

receive the concealed text $[x] := ([x_1], \ldots, [x_n])$ as input;

acquire a concealed text $[a] := ([a_1], \ldots, [a_n])$ of a parameter a $:= (a_1, \ldots, a_n)$ corresponding to a value $x := (x_1, \ldots, x_n)$ for each integer j, where $a_j$ is defined as a parameter $p_i$ corresponding to the section $R_i$ including the value $x_j$;

calculate the polynomial g([x], [a]) by using the concealed text [x] of the value x as input based on the concealed text [a] of the parameter a so as to obtain the concealed text [z] of the approximate value z for the function value y; and set the concealed text [z] as output of each of the three or more secure computation apparatuses, wherein the processing circuitry acquires the concealed text $[a] := ([a_1], \ldots m [a_n])$ of the parameter $a := (a_1, \ldots, a_n)$ based on a formula:

$$([a_1], \ldots, [a_n]) \leftarrow \text{BatchMap}([x], (u_1, \ldots, u_m), (p_1, \ldots, p_m))$$

where BatchMap is defined as a secure computation batch mapping algorithm, $u_i$ is defined as a value indicating a boundary of the section $R_i$, and $u_i < u_{i+1}$.

2. The secret batch approximation system according to claim 1, wherein the function f is a sigmoid function with a domain of definition expressed as $X := [0, 1000)$, $m \leq 5000$ holds.

3. The secret batch approximation system according to claim 1, wherein the polynomial g is a quadratic polynomial.

4. A secure computation apparatus that is included in a secret batch approximation system, the secret batch approximation system including three or more secure computation apparatuses that cooperatively calculate a concealed text $[z] := ([z_1], \ldots, [z_n])$ of an approximate value $z := (z_1, \ldots, z_n)$ for a function value $y := (y_1, \ldots, y_n)$ satisfying $y_j = f(x_j)$ for each integer j, the integer j being greater than or equal to 1 and less than or equal to n, by using a concealed text $[x] := ([x_1], \ldots, [x_n])$ of n pieces of values $x := (x_1, \ldots, x_n)$ as input when n is defined as an integer greater than or equal to 1, wherein m is defined as an integer greater than or equal to 2, g is defined as a polynomial for approximating each section of m sections into which a function f is divided, i is defined as each integer greater than or equal to 1 and less than or equal to m, $R_i$ is defined as one of the m sections, and $p_i$ is defined as a parameter of the polynomial g corresponding to the section $R_i$, the secure computation apparatus comprises processing circuitry configured to:

receive the concealed text $[x] := ([x_1], \ldots, [x_n])$ as input;

acquire a concealed text $[a] := ([a_1], \ldots, [a_n])$ of a parameter $a := (a_1, \ldots, a_n)$ corresponding to a value $x := (x_1, \ldots, x_n)$ for each integer j, where $a_j$ is defined as a parameter $p_i$ corresponding to the section $R_i$ including the value $x_j$;

calculate the polynomial g([x], [a]) by using the concealed text [x] of the value x as input based on the concealed text [a] of the parameter a so as to obtain the concealed text [z] of the approximate value z for the function value y; and set the concealed text IzI as output of each of the three or more secure computation apparatuses, wherein the processing circuitry acquires the concealed text $[a] := ([a_1], \ldots, [a_n])$ of the parameter $a := (a_1, \ldots, a_n)$ based on a formula:

$$([a_1], \ldots, [a_n]) \leftarrow \text{BatchMap}([x], (u_1, \ldots, u_m), (p_1, \ldots, p_m))$$

where BatchMap is defined as a secure computation batch mapping algorithm, $u_i$ is defined as a value indicating a boundary of the section $R_i$, and $u_i < u_{i+1}$.

5. A non-transitory computer readable medium having a program recorded thereon for making a computer function as the secure computation apparatus according to claim 4.

6. The secret batch approximation system according to claim 4, wherein the polynomial g is a cubic polynomial.

7. A secret batch approximation method that is executed by a secret batch approximation system, the secret batch approximation system including three or more secure computation apparatuses that cooperatively calculate a concealed text $[z] := ([z_1], \ldots, [z_n])$ of an approximate value $z := (z_1, \ldots, z_n)$ for a function value $y := (y_1, \ldots, y_n)$ satisfying $y_j = f(x_j)$ for each integer j, the integer j being greater than or equal to 1 and less than or equal to n, by using a concealed text $[x] := ([x_1], \ldots, [x_n])$ of n pieces of values $x := (x_1, \ldots, x_n)$ as input when n is defined as an integer greater than or equal to 1, wherein m is defined as an integer greater than or equal to 2, g is defined as a polynomial for approximating each section of m sections into which a function f is divided, i is defined as each integer greater than or equal to 1 and less than or equal to m, $R_i$ is defined as one of the m sections, and $p_i$ is defined as a parameter of the polynomial g corresponding to the section $R_i$, the secure computation apparatus comprises processing circuitry configured to:

receiving, by processing circuitry of each of the three or more secure computation apparatuses, the concealed text $[x] := ([x_1], \ldots, [x_n])$ as input, acquiring, by processing circuitry of each of the three or more secure computation apparatuses, a concealed text $[a] := ([a_1], \ldots, [a_n])$ of a parameter $a := (a_1, \ldots, a_n)$ corresponding to a value $x := (x_1, \ldots, x_n)$ for each integer j, where $a_j$ is defined as a parameter $p_i$ corresponding to the section $R_i$ including the value $x_j$, calculating, by the processing circuitry of each of the three or more secure computation apparatuses, the polynomial g([x], [a]) by using the concealed text [x] of the value x as input based on the concealed text [a] of the parameter a so as to obtain the concealed text [z] of the approximate value z for the function value y, and setting, by the processing circuitry of each of the three or more secure computation apparatuses, the concealed text [z] as output of each of the three or more secure computation apparatuses, wherein the method further comprises:

acquiring the concealed text $[a] := ([a_1], \ldots, [a_n])$ of the parameter $a := (a_1, \ldots, a_n)$ based on a formula:

$$([a_1], \ldots, [a_n]) \leftarrow \text{BatchMap}([x], (u_1, \ldots, u_m), (p_1, \ldots, p_m))$$

where BatchMap is defined as a secure computation batch mapping algorithm, $u_i$ is defined as a value indicating a boundary of the section $R_i$, and $u_i < u_{i+1}$.

* * * * *

UNITED STATES PATENT AND TRADEMARK OFFICE
CERTIFICATE OF CORRECTION

| | | |
|---|---|---|
| PATENT NO. | : 12,341,885 B2 | Page 1 of 1 |
| APPLICATION NO. | : 17/055993 | |
| DATED | : June 24, 2025 | |
| INVENTOR(S) | : Koki Hamada | |

It is certified that error appears in the above-identified patent and that said Letters Patent is hereby corrected as shown below:

In the Claims

Column 9, Line 21 Claim 1, delete "$u_i < u_{+1}$" and insert --$u_i < u_{i+1}$--

Column 9, Line 61 Claim 4, delete "IzI" and insert --[z]--

Column 10, Line 18 Claim 7, delete "that cooperatively calculate" and insert --for cooperatively calculating--

Column 10, Lines 32-33 Claim 7, delete "the secure configuratoin apparatus comprises processing circuitry configured to:" and insert --the secret batch approximation method comprising:--

Signed and Sealed this
Eighteenth Day of November, 2025

John A. Squires
*Director of the United States Patent and Trademark Office*